(12) United States Patent
Sethi et al.

(10) Patent No.: US 11,934,493 B2
(45) Date of Patent: Mar. 19, 2024

(54) ANTI-PIRACY PROTECTION SERVICE-BASED SOFTWARE LICENSE MANAGEMENT SYSTEM TO PREVENT USAGE OF UNLICENSED SOFTWARE AFTER THE TRIAL PERIOD

(71) Applicant: EMC IP Holding Company LLC, Hopkinton, MA (US)

(72) Inventors: Parminder Singh Sethi, Punjab (IN); Madhuri Dwarakanath, Bangalore (IN); Bing Liu, Tianjin (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 29 days.

(21) Appl. No.: 17/350,295

(22) Filed: Jun. 17, 2021

(65) Prior Publication Data
US 2022/0405354 A1 Dec. 22, 2022

(51) Int. Cl.
*G06F 21/12* (2013.01)
*G06F 21/10* (2013.01)

(52) U.S. Cl.
CPC ............ *G06F 21/121* (2013.01); *G06F 21/10* (2013.01); *G06F 21/1078* (2023.08)

(58) Field of Classification Search
CPC ............ G06F 21/10; G06F 2221/0771; G06F 21/105; G06F 21/121
See application file for complete search history.

(56) References Cited

U.S. PATENT DOCUMENTS

| | | | | |
|---|---|---|---|---|
| 8,175,978 | B2 * | 5/2012 | Endoh | G06F 21/10 705/902 |
| 2004/0066417 | A1 * | 4/2004 | Anabuki | G06F 21/10 715/848 |
| 2005/0015218 | A1 * | 1/2005 | Levi | G06F 21/121 702/186 |
| 2006/0008256 | A1 * | 1/2006 | Khedouri | H04N 21/4788 348/E7.071 |
| 2006/0026105 | A1 * | 2/2006 | Endoh | G06F 21/10 705/59 |
| 2006/0143713 | A1 * | 6/2006 | Challener | G06F 21/565 726/24 |
| 2006/0259791 | A1 * | 11/2006 | Dockser | G06F 9/3869 713/300 |
| 2007/0067301 | A1 * | 3/2007 | Malik | G06F 21/105 |
| 2007/0130073 | A1 * | 6/2007 | Celli | G06F 21/121 705/51 |
| 2007/0149174 | A1 * | 6/2007 | Torvinen | H04M 15/00 455/412.1 |
| 2009/0228450 | A1 * | 9/2009 | Zhang | G06F 21/10 713/168 |
| 2015/0227753 | A1 * | 8/2015 | Callaghan | G06F 21/10 713/165 |
| 2015/0310449 | A1 * | 10/2015 | Kurimoto | G06Q 30/016 705/304 |

\* cited by examiner

*Primary Examiner* — Dao Q Ho
(74) *Attorney, Agent, or Firm* — Workman Nydegger (57) ABSTRACT

One example method, includes checking, by an intelligent time detector service running on a computing system, a trial period duration of software on the computing system, starting, by the intelligent time detector service, a counter for the software, and the counter is operable to generate a counter value based on a clock of the computing system, storing, by the intelligent time detector service, a counter value of the counter, and decommissioning, by the intelligent time detector service, the software after the trial period has expired.

16 Claims, 8 Drawing Sheets

ANTI-PIRACY PROTECTION SERVICE-BASED SOFTWARE LICENSE MANAGEMENT SYSTEM TO PREVENT USAGE OF UNLICENSED SOFTWARE AFTER THE TRIAL PERIOD

FIELD OF THE INVENTION

Embodiments of the present invention generally relate to preventing usage of unlicensed software. More particularly, at least some embodiments of the invention relate to systems, hardware, software, computer-readable media, and methods for an intelligent time detector operable to detect start and end times of a software trial period.

BACKGROUND

In the globalized world of today, the use of enterprise devices and personal computers has increased immensely. Approximately 70-80% of the world population use laptops extensively. For hardware to run, software is an integral part, and there are many software tools that are designed to perform different tasks. All these tools also require a mandatory active license, and organizations have provided the option of using trial version of the software for a set number of days. This gives an opportunity for users to first try the software for limited period before buying the license for the software. With the increase in number of software-based tools, software fraud is now becoming a common problem for many applications. Users are finding different fraudulent methods to manipulate data and use the software even after the trial period has expired using various common hacks, examples of which are discussed below.

One commonly employed hack is the modification of system date. In this approach, the user adopts a simple workaround of modifying the date of the system as the trial period is about to end. The software is now still under trial period and enables the user to use it without any expense.

Another example of a user hack to avoid software trial period limitations involves deleting the software data. Particularly, a user deletes the software source files that store data such as installation date and time, and the software has no methods to verify these attributes, with the result that the user is able to obtain unlimited access to the software.

Still another approach used by some to gain unauthorized access to trial basis software involves simply deleting the software. For example, a user can erase all the software related files from the system. This enables the user to perform a fresh installation of the software and then reuse the software again. The software files are repeatedly deleted after the trial period and reinstalled again. This process continues and users can use the software for a prolonged period without any expense.

Finally, some users may perform a hack that involves modifying the REGEDIT key value pair. In this hack, certain information pertaining to the software is stored in the operating system (OS) registry edit as a 'key-value' pair. Users who are aware of such technical information can easily access this registry and modify this key value pair which, in turn, leads to extension in the trial version of the software.

In light of such data manipulation techniques used by hackers, there is a need to be able to prevent usage of unlicensed software after the trial period expires.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to preventing usage of unlicensed software. More particularly, at least some embodiments of the invention relate to systems, hardware, software, computer-readable media, and methods for an intelligent time detector operable to detect start and end times of a software trial period.

In general, example embodiments provide a technique that organizations can implement to ensure that they protect their software licenses from being modified by hackers. At least some example embodiments involve the use of an Intelligent Time Detector (ITD) module and/or service to ensure that a user is denied access to the software once the trial period of the software is complete. The user is not granted access to use the software until he renews the necessary licenses. Once a user installs a trial software on the system, the Intelligent Time Detector will start a counter in a seconds format which is synched to a system clock of the system on which the software is installed. The Intelligent Time Detector increases the seconds count in the timer as the system clock ticks. Even if a user modifies the system date, the user cannot modify the seconds count in the system clock. Because the ITD is synched to the system clock, the ITD may accurately determine when the trial period has expired.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that an embodiment may prevent a user from obtaining unauthorized access to software whose trial period has expired. An embodiment may be resistant to hacks commonly used to circumvent or extend software trial periods. An embodiment of the invention may be configured to track a software trial period even if the system where the software is installed is shut down, and/or if system clock interrupt events occur. An embodiment of the invention may reduce the amount of revenue lost by a company due to software piracy.

A. Aspects of Some Example Embodiments

Figure 1:
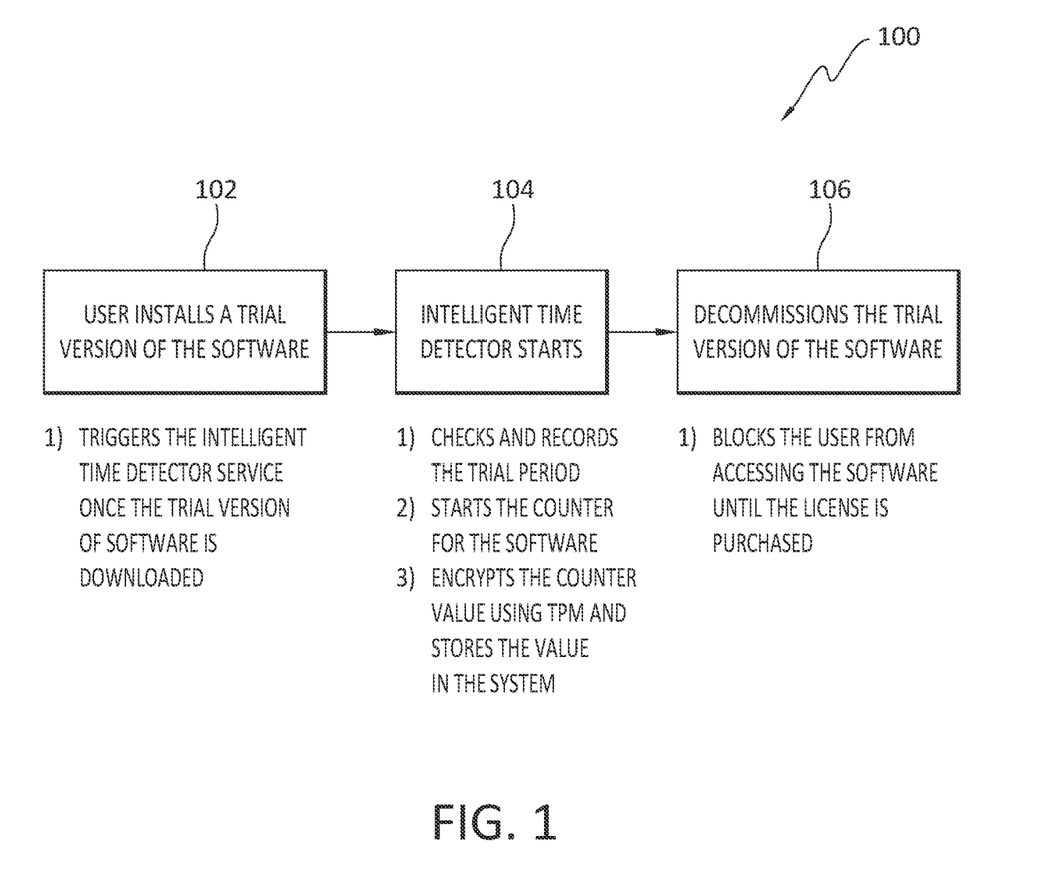
FIG. 1 discloses aspects of an overall method of operation of an example intelligent time detector module and associated service.
Figure 1A:
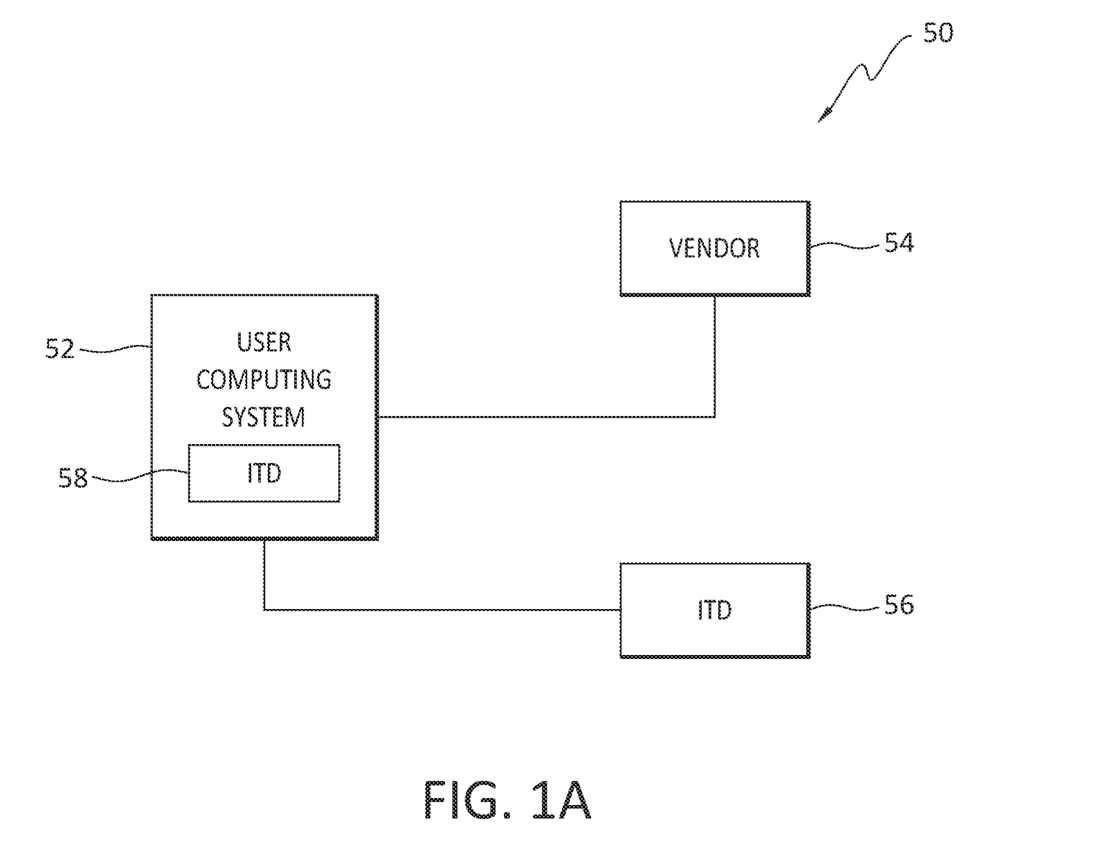
FIG. 1A discloses aspects of an example architecture for some embodiments.

With attention first to FIG. 1A, an overall configuration 50 of some example embodiments is disclosed. The configuration 50 may comprise one or more user computing systems 52 that may communicate with a vendor site to download software available from the vendor 54. The configuration 50 may additional comprise an Intelligent Time Detector 56 which may be provided as a service to the vendor 54 and user computing system 52. Additionally, or alternatively, the Intelligent Time Detector may reside on a user computing system 52 as an Intelligent Time Detector module 58 that provides a service which runs on the user computing system 52.

In general, and with reference to the example of FIG. 1, example embodiments may employ a multi-stage process to prevent software license fraud. In the example of FIG. 1, the example process 100 may include three stages, namely, startup of the Intelligent Time Detector when the user installs 102 a trial version of software on the user system. The next stage may involve storing the time in a Trusted Platform Module (TPM) after the ITD has started 104. A third stage may involve decommissioning 106 the trial version of software after it has been determined that the trial period has expired. Thus, in some example embodiments at least, the process 100 may be performed entirely on the system where the trial software is installed, although that is not necessarily required.

A.1 Intelligent Time Detector Startup

With continued reference now to the initial stage involving startup of the ITD, when a software associated with a trial period is installed on the system, a license management application (LMA), such as the Dell License Management application for example, may create an instance of the software in its database and the ITD may then starts the counter. The start time of the trial period and the expiry time of the trial period may be stored in the LMA database to enable accurate monitoring of the software trial period accurately. The LMA database may be located remotely from the system where the software is installed, such as at a site from which the software was downloaded or otherwise obtained.

In more detail, installation of the trial version software 102 may trigger the ITD service, which may be embedded in, and invoked by, the trial version software. That is, once the software is downloaded, the ITD service may be triggered, even if the software has not been installed yet. Thus, the user may not be able to delay the start of the trial period simply by downloading, but not installing, the software. In other embodiments, the start of the trial period may be delayed until the software has been installed on the user system.

After the ITD has started 104, the ITD may check and record the trial period, that is, the amount of time defined by the trial period. The ITD may then start the counter for the downloaded software. As well, the ITD may encrypt a counter value so that the counter value cannot be tampered with by an unauthorized user. In some embodiments, encryption of the counter value may be performed by a Trusted Platform Module (TPM) included in the ITD, although that is not necessarily required. The encrypted counter value may be stored in the user system, and may also be stored at the site from which the user obtained the software.

When the trial period has run, as determined by the counter, the software may be decommissioned 106 by the ITD. In some embodiments, decommissioning of the software may include blocking the user from accessing the software until the user purchases a valid license for the software.

It is noted that embodiments may also prevent a user from performing another installation of the software on another system. That is, embodiments may permit only a single installation, and may implement a counter, or clock, synchronized to the clock of the system where the software is installed. In this way, a user cannot circumvent the counter by installing the software on another system.

In the following discussion, various considerations concerning some example embodiments are addressed. Such considerations include identifying some example uses of the ITD, determining what happens to the counter when the system is in the shutdown phase, and determining what happens to the counter value when the system is down for some hours, for example, 2 hours, 24 hours, or more.

In general, a primary function of the ITD may be to run the counter continuously and accurately in the background. The trial period duration for an installed software may be obtained from this ITD instead of by verifying the system date/time. In more detail, the ITD may be tagged to the system service and may be attached to the system power-on and power-off attributes. Typically, there are a number of settings that can be configured in the operating system (OS) of the system where the software is installed. For example, as part of a factory configuration, a system service may be registered and connected with the power-on and power-off of the system. This may be done at the operating system level and hence cannot be easily manipulated, or manipulated at all, by the hacker/un-authorized user at any point in time.

While it may be possible for any user to customize what applications should start upon system power-on, and what applications to close last upon system power-off, the user typically has the privilege to configure these settings only for user-installed applications, and not for the system services. In at least some embodiments then, the ITD and its operations may be made available only as system service and, hence, the ITD and its operations may not be able to be manipulated by a user. In addition, there may be some default applications that are started automatically in the background by the operating system.

A.2 Counter Value at System Power Down

Figure 2:
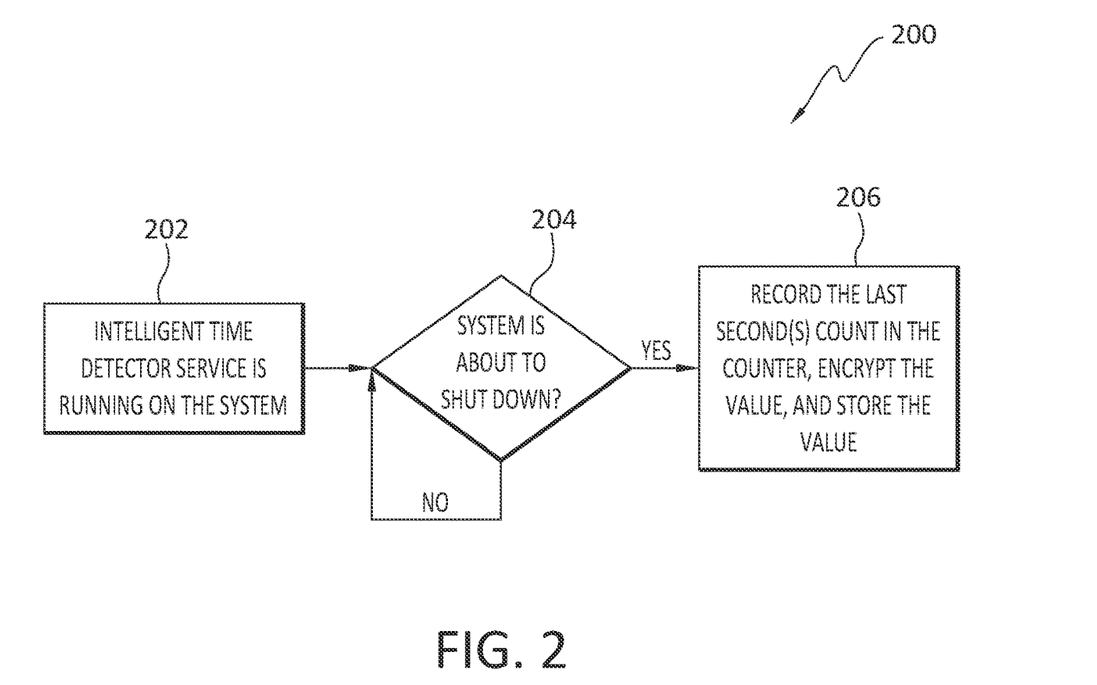
FIG. 2 discloses aspects of an example method for managing a counter when a computing system with which the counter system is associated is about to shut down.

With reference next to FIG. 2, details are provided concerning operational aspects of various embodiments when a system where the software is installed is powered down. In general, FIG. 2 is directed to an example process 200 that involves operations relating to shut down of the system on which the trial software is installed. At least some of these operations may concern what happens to the counter value when the system is shutting down.

In more detail, the ITD service running on the system 202 may be configured to be started immediately upon first logon, and may be configured to close last when the system is powered-off before the operating system shuts down. As the system is about to be powered off, the systems date and time (the last second count) may be recorded and stored in the database by the ITD.

That is, when the ITD service is running 202, a periodic check 204 may be performed by the ITD, and/or the ITD may be notified by the system, that the system may be about to shut down. If the ITD determines 204 that the system is not about to shut down, the ITD may continue to run 202 and perform periodic checks 204. On the other hand, if the ITD determines 204, or is informed that, the system is about to shut down, the ITD may then record the last second(s) count in the counter, encrypt the recorded value, and then store the encrypted value. For example, the counter value might be 22:13:09 (22 hours, 13 minutes, and 9 seconds), and this value may be encrypted by a TPM.

A.3 Counter Value at System Startup

Figure 3:
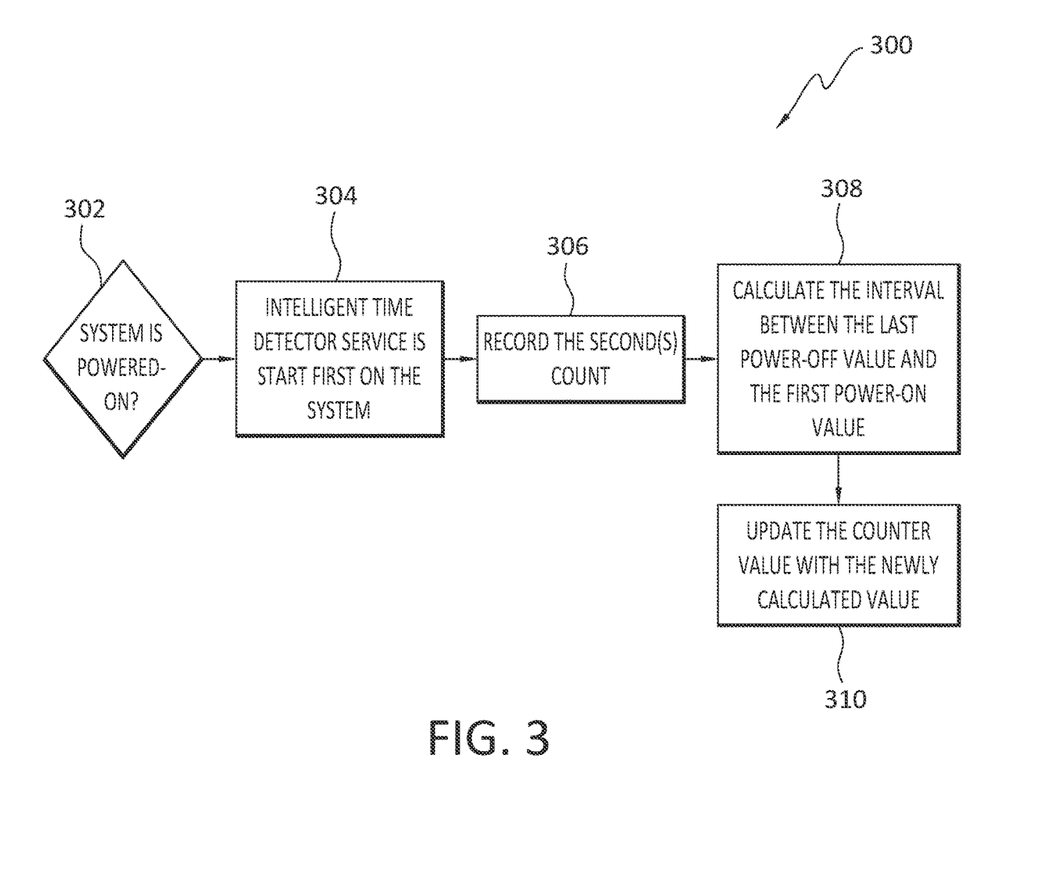
FIG. 3 discloses aspects of an example method for updating a counter when a computing system has been powered up after a power down.

With reference next to FIG. 3, details are provided concerning operational aspects of various embodiments when a system where the software is installed is started up. In general, FIG. 3 is directed to an example process 300 that involves operations relating to power up of the system on which the trial software is installed. At least some of these operations may concern what happens to the counter value when the system is powered up.

Initially, the ITD may verify 302 that the system has been powered up, or is in the process of being powered up. When is the system is powered-on, the ITD may be the first system service to start 304 and the ITD may, again, record the system date/time (the first second count). By comparing the system date/time at power-off with the system date/time at power-on, the elapsed time interval between power-off and power-on may be determined. Since the counter may have stopped at power-off, its value may not reflect the elapsed time interval. Accordingly, the elapsed time interval that was determined may be used to update the counter so that the counter accurately reflects the amount of time that has passed since the software was first installed. Further, because the system date/time may not be changeable by a user, some assurance may be had that the system date/time information is correct.

For example, if the system time was 22:37 on May 19, 2021 at power off, and 24:42 on May 19, 2021, at power on, the 2:05 interval between those two times may be calculated at or after power-on, and the counter incremented upwards by 2:05 from what the counter value was at the last power-off. In this way, the counter may be updated to reflect the passage of time that occurred while the system was down. Moreover, because the counter value at power-off was recorded, encrypted, and stored, there may be assurance that the counter value at power-on is correct and has not been tampered with. In this way, all the inputs to determination of the counter value, that is, the counter value at power-on and the system date/time information, may be made secure, thus providing assurance that the updated, or new, counter value is accurate.

The new counter value, that is, the value of the counter after the counter has been adjusted to reflect the time elapsed between power-off and power-on, may again be stored in the database from time to time. Since the user cannot change the system date/time during shutdown or power-on service, the counter value may always be accurate. This is done to ensure that the application maintains the actual date and time irrespective of the system shutting down or a user changing date/time between power-up and power-down.

A.4 Clock Interrupt Events

Figure 4:
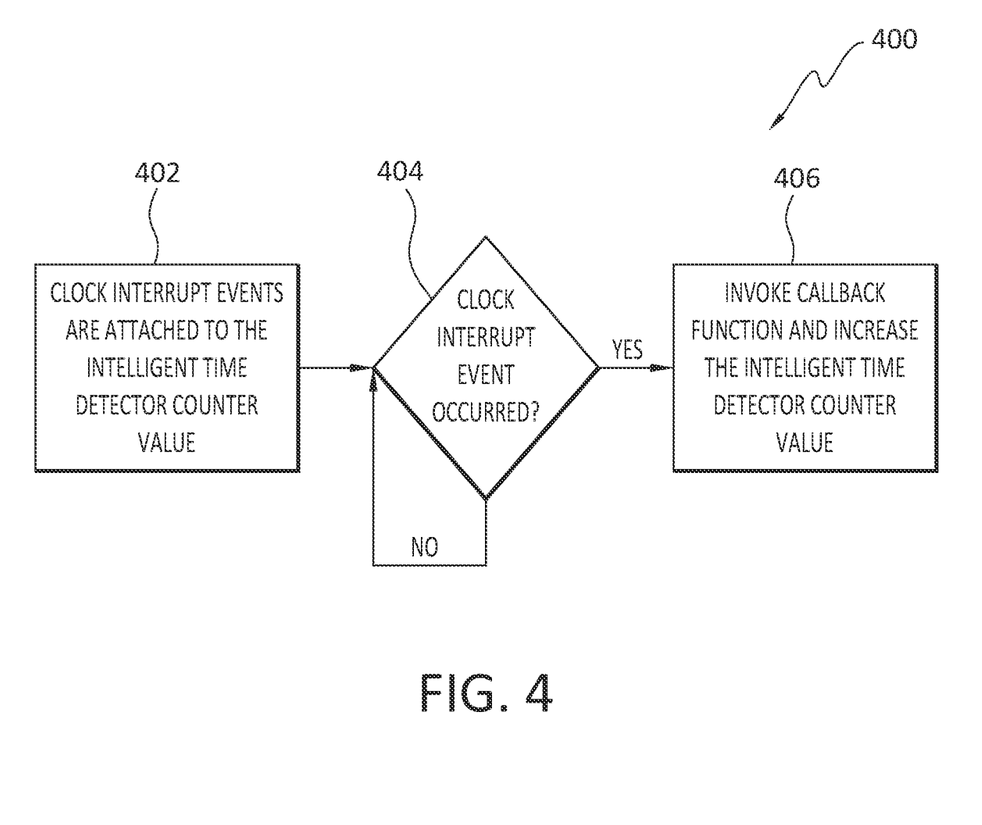
FIG. 4 discloses aspects of an example method for updating a counter after a clock interrupt event has occurred.

With reference next to FIG. 4, details are provided concerning operational aspects of various embodiments when a system where the software is installed experiences one or more clock interrupt events. In general, FIG. 4 is directed to an example process 400 that involves operations relating to how the ITD may count clock ticking to arrive at a counter value.

An operating system (OS) of a computing system may run the clock interrupt events, or timer interrupts, periodically. These clock interrupt events may be configured by the OS and may be used to support multitasking. Thus, embodiments of the invention may account for the occurrence of such clock interrupt events. For example, an embodiment of the invention may attach or associate the ITD module 402 with the clock interrupts of the OS. For example, the ITD module may connect to, or otherwise communicate with, the OS so that the ITD module is aware of when a clock interrupt has occurred and/or is occurring.

Next, a check 404 may be performed, such as on an ad hoc or periodic basis for example, to determine if a clock interrupt event has occurred. For example, a clock interrupt event may comprise a change to the clock date/time. Such a change to the system time may be made by a user, for example, after the system has been powered on. The OS may then create an interrupt on the clock, noting the change that was made to the clock date/time.

As, and when, the clock interrupt event has been determined to have occurred in the operating system, a callback function may be invoked 406 by the operating system and the counter value of the ITD increased accordingly. To prevent an overflow issue, some embodiments may employ a 64-bit unsigned long counter such as jiffies_64 way. Because this process may be keyed to the operating system clock interrupt data, even if a user changes the system date/time, for whatever reason, the user will not be able to use a software after the trial period ends without purchasing the license.

A.5 New Trial Software Installations

Figure 5:
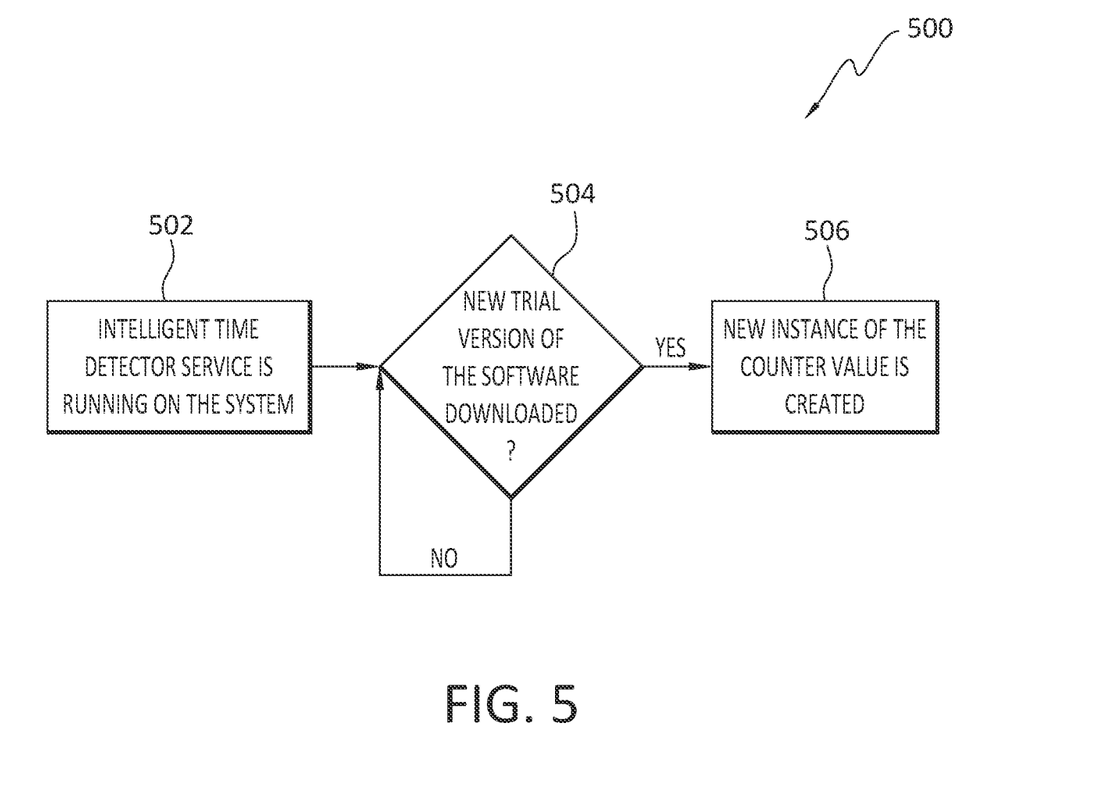
FIG. 5 discloses aspects of an example method for installing and running a counter when a new software has been installed on a computing system.

With reference next to FIG. 5, details are provided concerning operational aspects of various embodiments when a system where a new trial software is installed. In general, FIG. 5 is directed to an example process 500 that involves operations relating to operations of an embodiment relating to the installation of new trial software on a system.

Initially, the ITD may be running 502 on the system where the new software is to be installed. Next, a check 504 may be performed, such as on an ad hoc or periodic basis for example, to determine if any new trial software has been installed. In some embodiments, the OS may detect installation of the new trial software. When a new software is installed, a new instance is created 506 by the ITD. For example, the ITD may create another counter for the new software, and the new counter may be initialized to start at zero, or some other predetermined value.

A.6 Storing Time Using a TPM

As noted earlier, some example embodiments may comprise three states, the first being startup of the ITD, and the second of which may be storing the time by the ITD using a TPM. Following is a discussion of aspects of an example implementation.

When a trial version of the software is downloaded, the ITD may store, in the system, all the data that is related to the software in the system. Such data may include, for example, the trial period length, start time of the trial period, trial period expiry, and license and license renewal details. The trial period may be converted to seconds before being stored by the ITD.

Before saving the information in the system, the counter value, which may be expressed in seconds, is encrypted, such as with the Trusted Platform Module (TPM) for example. When retrieving the counter value, the counter value may be decrypted, such as by the TPM on request from the ITD, by using the same TPM key that was used to encrypt the counter value. The TPM encryption/decryption key may be stored using any name, such as random name that is not relevant to the downloaded software. The use of a name with no/little apparent relationship to the counter value may contribute further to the security of the counter value.

It is noted that a TPM may take the form of a microcontroller that may store all artifacts in an encrypted format. In at least some embodiments, the data cannot be decrypted by any system or individual other than the TPM itself. Even if the user traces the values and tries to manipulate them, the user cannot edit the data as it is encrypted and stored by the TPM. Thus, assurance may be had that the encrypted stored counter values are safe from tampering.

A.7 Decommissioning the Trial Version Software

As noted earlier, some example embodiments may comprise three states, the first being startup of the ITD, the second of which may be storing the time by the ITD using a TPM, and the third of which may involve decommissioning the trial version software after the trial period has run. Following is a discussion of aspects of an example implementation.

Figure 6:
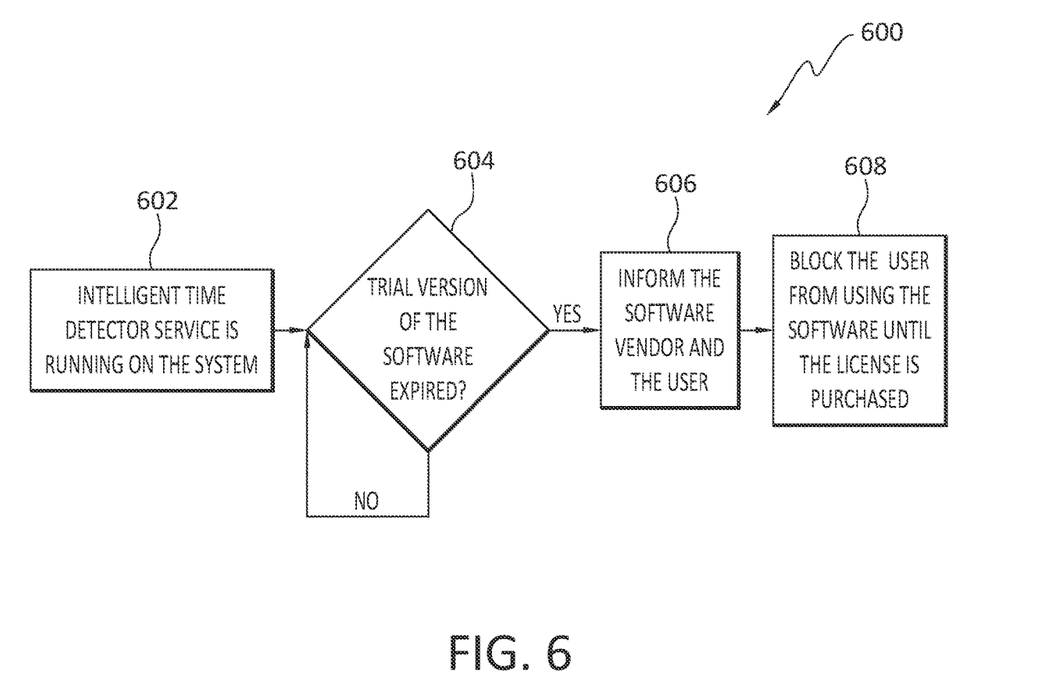
FIG. 6 discloses aspects of an example method for decommissioning software after a trial period of the software has expired.

With reference next to FIG. 6, details are provided concerning operational aspects of various embodiments when a software trial period has run. In general, FIG. 6 is directed to an example process 600 that involves operations relating to how the ITD may monitor the software, and then decommission the software at the end of the trial period.

Initially, the ITD service may be running 602 on the system where the trial software has been installed. Next, a check 604 may be performed, such as on an ad hoc or periodic basis for example, to determine whether the software trial period has expired yet. If or when a determination is made by the ITD that the software trial period has ended, the ITD service may send 606 a notification to the user and/or the software vendor that the trial period has expired.

When the trial period of the software ends, the user may be blocked 608 from using the software until the license is purchased. The blocking may be performed by the software based on input from the ITD, or maybe performed by the ITD itself. This information concerning expiration of the trial period, which may already be stored in the system, may enable the software vendors to help the users in renewing the license and performing the next steps. The expiry and uninstall data may also be encrypted by TPM, and stored in the cloud and/or elsewhere, to prevent multiple retrials and reinstallation by the user.

It is noted with respect to the example methods of FIGS. 1-6 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Further, any of the example methods of FIGS. 1-6 may be performed in whole or in part by an ITD module performing/providing an ITD service. The ITD module may be embedded in trial software and/or may be present on a system where trial software is to be installed and/or has been installed. In some embodiments, installation of an ITD module may be a prerequisite to installation of trial software. For example, when installation of trial software is initialized, the ITD module, which may or may not be embedded as part of the trial software, may be installed before any executable software components and, only after successful installation of the ITD module, may installation of the software components begin. Moreover, and as noted elsewhere herein, an ITD service installed on a computing system may be automatically invoked whenever new software is downloaded. Where the downloaded software does not have an associated trial period that may necessitate involvement of the ITD service, the ITD service may then be terminated after the download has been completed. The invocation and termination of the ITD service in this example may be transparent to the user, that is, the user may be unaware that those processes have been performed. As well, a user may or may not be informed, such as by the ITD service, when the ITD service has been instantiated in response to the downloading or installation of trial basis software.

B. Further Example Embodiments

Following are some further example embodiments of the invention. These are presented only by way of example and are not intended to limit the scope of the invention in any way.

Embodiment 1. A method, comprising: A method, comprising operations of: checking, by an intelligent time detector service running on a computing system, a trial period duration of software on the computing system; starting, by the intelligent time detector service, a counter for the software, and the counter is operable to generate a counter value based on a clock of the computing system; storing, by the intelligent time detector service, a counter value of the counter; and decommissioning, by the intelligent time detector service, the software after the trial period has expired.

Embodiment 2. The method as recited in embodiment 1, wherein the counter value is encrypted by a TPM module prior to being stored.

Embodiment 3. The method as recited in any of embodiments 1-2, wherein the intelligent time detector service calculates a time interval between a power-down and power-up of the computing system, and the intelligent time detector service updates the counter using the time interval.

Embodiment 4. The method as recited in any of embodiments 1-3, wherein the counter is triggered to start by downloading of the software to the computing system has been completed, or is triggered by installation of the software on the computing system.

Embodiment 5. The method as recited in any of embodiments 1-4, wherein a user of the computing system and/or a vendor of the software are notified when the trial period has expired.

Embodiment 6. The method as recited in any of embodiments 1-5, wherein an accuracy of the counter is maintained notwithstanding a change to the system clock.

Embodiment 7. The method as recited in any of embodiments 1-6, the intelligent time detection service prevents reinstallation of the software after the trial period has expired.

Embodiment 8. The method as recited in any of embodiments 1-7, wherein the intelligent time detection service increments the counter based on the system clock.

Embodiment 9. The method as recited in any of embodiments 1-8, wherein the intelligent time detection system prevents tampering with the counter and counter value.

Embodiment 10. The method as recited in any of embodiments 1-9, wherein the intelligent time detection system encrypts software expiration information and software uninstallation information.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any one or more of embodiments 1-11.

C. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
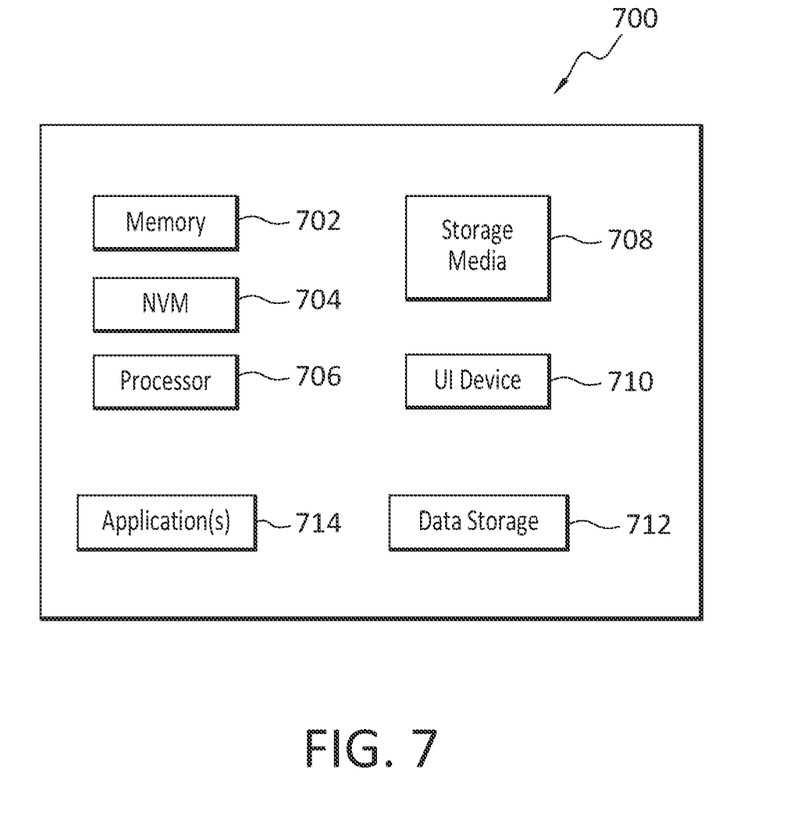
FIG. 7 discloses aspects of an example computing entity operable to perform any of the disclosed methods, processes, and operations.

With reference briefly now to FIG. 7, any one or more of the entities, disclosed, or implied, by FIGS. 1-6 and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage.

As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising operations of:
    checking, by an intelligent time detector service running on a computing system, a trial period duration of software on the computing system;
    starting, by the intelligent time detector service, a counter for the software, and the counter is configured to generate a counter value based on a clock of the computing system;
    storing, by the intelligent time detector service, a counter value of the counter, wherein an accuracy of the counter value is maintained notwithstanding a change to the system clock; and
    when the counter value reaches the trial period duration, decommissioning, by the intelligent time detector service, the software after the trial period has expired,
    wherein the intelligent time detector service prevents tampering with the counter and counter value.

2. The method as recited in claim 1, wherein the counter value is encrypted by a Trusted Platform Module (TPM) module prior to being stored.

3. The method as recited in claim 1, wherein the intelligent time detector service calculates a time interval between a power-down and power-up of the computing system, and the intelligent time detector service updates the counter using the time interval.

4. The method as recited in claim 1, wherein the counter is triggered to start by downloading of the software to the computing system has been completed, or is triggered by installation of the software on the computing system.

5. The method as recited in claim 1, wherein a user of the computing system and/or a vendor of the software are notified when the trial period has expired.

6. The method as recited in claim 1, the intelligent time detector service prevents reinstallation of the software after the trial period has expired.

7. The method as recited in claim 1, wherein the intelligent time detector service increments the counter based on the system clock.

8. The method as recited in claim 1, wherein the intelligent time detector system encrypts software expiration information and software uninstallation information.

9. A computer readable storage medium having stored therein instructions that are executable by one or more hardware processors to perform operations comprising:
    checking, by an intelligent time detector service running on a computing system, a trial period duration of software on the computing system;
    starting, by the intelligent time detector service, a counter for the software, and the counter is configured to generate a counter value based on a clock of the computing system;
    storing, by the intelligent time detector service, a counter value of the counter, wherein an accuracy of the counter value is maintained notwithstanding a change to the system clock; and
    when the counter value reaches the trial period duration, decommissioning, by the intelligent time detector service, the software after the trial period has expired,
    wherein the intelligent time detector service prevents tampering with the counter and counter value.

10. The computer readable storage medium as recited in claim 9, wherein the counter value is encrypted by a Trusted Platform Module (TPM) module prior to being stored.

11. The computer readable storage medium as recited in claim 9, wherein the intelligent time detector service calculates a time interval between a power-down and power-up of the computing system, and the intelligent time detector service updates the counter using the time interval.

12. The computer readable storage medium as recited in claim 9, wherein the counter is triggered to start by downloading of the software to the computing system has been completed, or is triggered by installation of the software on the computing system.

13. The computer readable storage medium as recited in claim 9, wherein a user of the computing system and/or a vendor of the software are notified when the trial period has expired.

14. The computer readable storage medium as recited in claim 9, the intelligent time detector service prevents reinstallation of the software after the trial period has expired.

15. The computer readable storage medium as recited in claim 9, wherein the intelligent time detector service increments the counter based on the system clock.

16. The computer readable storage medium as recited in claim 9, wherein the intelligent time detector system encrypts software expiration information and software uninstallation information.

\* \* \* \* \*